United States Patent [19]

Poor et al.

[11] Patent Number: 5,364,476
[45] Date of Patent: Nov. 15, 1994

[54] INDUSTRIAL VARIABLE CARBON POTENTIAL GAS GENERATOR

[75] Inventors: Ralph P. Poor; Michael J. Huber, both of Toledo, Ohio

[73] Assignee: Surface Combustion, Inc., Maumee, Ohio

[21] Appl. No.: 148,871

[22] Filed: Nov. 8, 1993

[51] Int. Cl.⁵ .............................................. B23K 35/24
[52] U.S. Cl. ....................................... 148/27; 148/235
[58] Field of Search ................................ 148/235, 27

[56] References Cited

U.S. PATENT DOCUMENTS

| | | | |
|---|---|---|---|
| 2,897,158 | 7/1959 | Sanzenbacher | 252/372 |
| 4,236,941 | 12/1980 | Main | 148/235 |
| 4,249,965 | 2/1981 | Schultz | 148/27 |
| 4,805,881 | 2/1989 | Schultz | 266/257 |

OTHER PUBLICATIONS

Generon brochure "The Gold Line Membrane Modules for Nitrogen Production".
Surface Combustion, Inc. brochure "RX Endothermic Gas Atmosphere Generator".
Pp. 125-131 of Dec. 1965 issue of "Iron and Steel Engineer" by E. Spielberger

*Primary Examiner*—Peter D. Rosenberg
*Attorney, Agent, or Firm*—Frank J. Nawalanic

[57] ABSTRACT

A variable gas generator is disclosed which is capable of producing a wide variety of product gas compositions heretofore produced only by either exothermic gas generators or endothermic gas generators or a combination of gas generators. The variable gas generator includes a nitrogen membrane module producing a nitrogen-oxygen feed gas which is combined with a hydrocarbon fuel and fed into a conventional endothermic gas generator. By controlling the nitrogen membrane module to produce a desired oxygen-nitrogen feed gas and by controlling the addition of methane and the catalyst bed temperature of the gas within the endothermic generator, a wide variety of product gas composition with carbon potential varying anywhere from one to 80% combustibles can be produced.

32 Claims, 3 Drawing Sheets

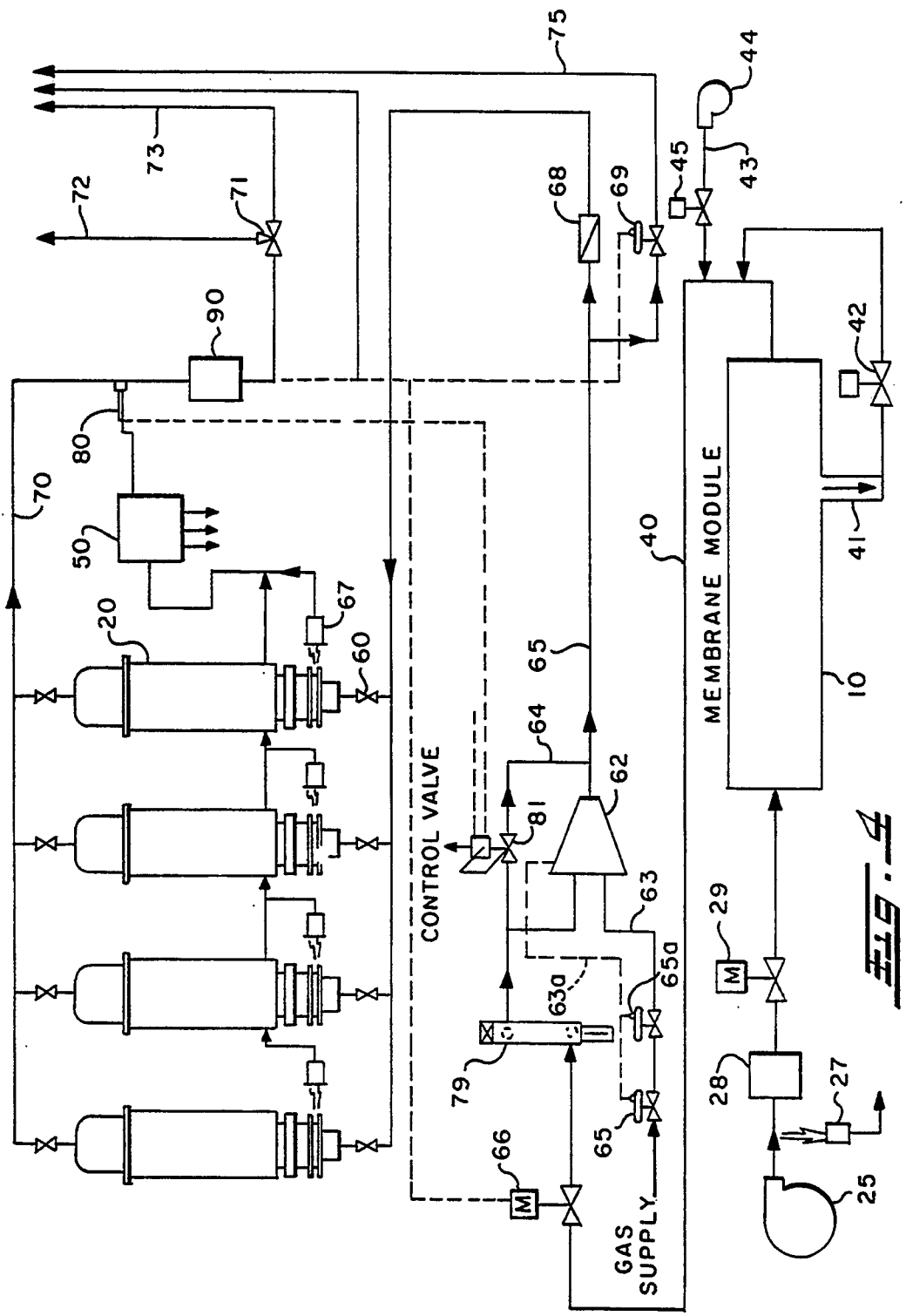

INDUSTRIAL VARIABLE CARBON POTENTIAL GAS GENERATOR

This invention relates generally to method and apparatus for generating a variety of gas compositions for use in various industrial processes and more particularly to industrial processes which use or employ heat or are heat driven.

The method and apparatus is particularly applicable to and will be described with specific reference to gas generators for use or in combination with industrial heat treat processes and/or furnaces in which the carbon potential of the gases used in the process must be controlled. However, it will be appreciated that the invention has broader applications and can also be used in applications where the presence of oxygen cannot be tolerated such as food service, grain storage etc.

INCORPORATION BY REFERENCE

Schultz U.S. Pat. No. 4,805,881 and Sanzenbacher U.S. Pat. No. 2,897,158 were developed by the present assignee, Surface Combustion, Inc., and are incorporated by reference herein so that details and concepts known in the art need not be restated herein. The patents do not form part of the present invention.

BACKGROUND

As a general concept, industrial heat treat processes (such as annealing, carburizing, clean hardening, etc), and various heat driven process (such as sintering, brazing, purging, blanketing) require a furnace atmosphere or furnace gas having certain characteristics, or generally speaking, a certain potential for producing carbon. The gas composition is well defined, as for example by Class designation specified by the American Society for Metals. Thus, the carrier gas used in carburizing is an endothermic base carrier gas specified by ASM as a class 300 gas typically having a gas composition of approximately 40% $N_2$, 40% $H_2$ and 20% CO. A typical gas composition would be:

| Gas Element | Percentage |
| --- | --- |
| $H_2$ | 40.4% |
| CO | 19.8% |
| $N_2$ | 39.0% |
| $CH_4$ | 0.5% |
| $H_2O$ | 0.2% |
| $CO_2$ | 0.1% |

Conceptually, there are three ways to supply at least some of the furnace atmospheres. First the furnace atmosphere can simply be supplied as a gas and stored on site for use in the process, i.e., liquid nitrogen. However, certain heat treat processes require tighter and tighter control of gas compositions so that even in the inert applications, such as nitrogen, oxygen presence of low PPM levels cannot be tolerated. It is possible, that even with commercial grade nitrogen stock, oxygen concentrations of 20 PPM can occur which exceeds the low oxygen concentrations now being specified.

A second way to form the furnace gas, is to react or dissociate a liquid, usually in the presence of heat, to produce its gaseous components. A typical example is ammonia which is dissociated to produce nitrogen and hydrogen. This is a commercially acceptable process but is somewhat costly, requires liquid gas storage facilities and does have a tendency to produce trace elements of the liquid as a gas in its original form, i.e., $NH_3$.

The last commercially-acceptable method for producing furnace atmospheres, and the one to which this invention relates, is the use of gas generators to develop a variety of furnace gas compositions by reacting a hydrocarbon fuel, such as natural gas (methane) with air.

Traditionally gas generators are defined as either exothermic or endothermic. An exothermic gas generator means a generator where the air is mixed with natural gas at ratios of anywhere between 6 to 9 parts air to 1 part natural gas (stoichiometric combustion occurring at about or slightly less than 9). At these ratios the air and gas burn with the products of combustion giving off heat and thus the designation of such generators as exothermic. Exothermic generators typically produce lean or inert atmospheres without (or with very little) combustibles and their applications typically involve annealing, furnace purging, brazing etc. Endothermic generators typically involve generators where the air to gas ratio is typically less than 6 to 1 and more specifically is generally set at 2.5 to 1. When air and $CH_4$ are supplied in such ratios, heat must be inputted to the mixture to dissociate the gases to their elemental form. As explained in the prior art patents, the gas reactions resulting during the dissociation of the gases are not entirely endothermic (just as certain gas reactions in the exothermic generator are not entirely exothermic). However, the term, endothermic, is used to describe such generators since heat is initially supplied to the air/natural gas mixture to raise the temperature of the mixture prior to entering the catalyst bed within the generator. Endothermic generators are typically used to produce Class 300 gas and any gas which is reducing or has combustibles such as $H_2$ or CO. Within the heat treating art generators which lack combustibles are viewed as non-reducing. Generated gases which contain less than 4% combustibles or 1% oxygen are viewed as inert.

Because a number of heat treat processes require certain percentages of gases it is not unusual to couple exothermic generators such as Surface Combustion's DX generators with endothermic generators such as Surface Combustion's RX generators. Nor is it unusual for specific process applications to use molecular sieves or desiccants to remove or reduce certain elements, such as $CO_2$ from the gas, in installations where HNX generators are employed such as in tin lines and other coating lines.

In general summary of the natural gas generator art as it now exists, two fundamentally different kinds of generators must be used depending on whether the gas composition is to be non-reducing or reducing (rich in combustibles). Further, depending on process requirements, a wide variety of additional equipment items are used to produce a wide range of gas compositions resulting from the product gas compositions produced by the endothermic and exothermic gas generators blending "RX" and "DX" gases. Thus, the existing generator art lacks flexibility to produce a wide variety of gas compositions. This results then in the user purchasing a relatively large number of expensive equipment items or adopting alternative gas producing approaches which have their own problems. Further, process control requirements are becoming increasingly tighter for gas compositions. As already noted, the presence of oxygen in certain inert type annealing atmospheres which can adversely affect the metal as an oxidizer, now require oxygen content to have no more than 1 PPM.

Apart from any considerations relating to gas generators, membrane nitrogen generators remove nitrogen from air by passing the air through a membrane which separates certain elements from the air. Specifically, a gas stream comprised substantially of nitrogen with varying amounts of oxygen can be produced. At this time, none of the known membrane systems can economically produce from air a substantially pure stream of nitrogen without the presence of oxygen in some amount. Thus these types of nitrogen generators are not sufficient, in and of themselves, to produce a stream of totally pure nitrogen which can be used as in inert furnace atmosphere for a relatively wide variety of purposes within the heat treat art.

SUMMARY OF THE INVENTION

It is thus a principal object of the present invention to provide a single apparatus (and method) for producing a wide variety of gas compositions at a low cost.

This object along with other features of the invention is provided by a gas generator which produces industrial gas mixtures suitable for use in a number of industrial processes using heat. The generator includes an air membrane module for producing a variable mixture of nitrogen and oxygen gases as an output stream therefrom and a source of hydrocarbon fuel such as natural gas. The nitrogen-oxygen output stream from the air membrane module and the hydrocarbon fuel is mixed and subsequently reacted within a conventional industrial furnace endothermic gas generator in the presence of heat to produce any desired industrial gas mixture thus obviating the need for the large number of gas generator applications and ancillary equipment now required.

Specifically, gas mixtures varying in combustibles from 1% to 80% are possible depending upon the control of the air membrane module to regulate the oxygen control of the nitrogen-oxygen output stream and the control of the endothermic gas generator. Still yet more specifically, gas compositions varying within ranges indicated below are possible.

| Gas Element | Percentage |
| --- | --- |
| $N_2$ | 20-99% |
| $H_2$ | 25-53% |
| CO | .5-27% |
| $CO_2$ | .01-.6% |
| $H_2O$ | .0-.1% |
| $CH_4$ | .0-.4% |

In accordance with another general feature of the invention, the air membrane module includes a conventional mechanism for pressurizing the air and heating the air inputted to the membrane to produce a first prime outlet stream of nitrogen and oxygen gases in a gas mixture where oxygen can comprise, as a set value, anywhere from about 1% to about 21% partial pressure of the first prime stream dependent upon inlet air, inlet pressure and temperature. Accordingly, it is a specific feature of the invention to react the oxygen when supplied at low levels of about 1% in the prime stream within an endothermic gas generator to produce an essentially pure inert gas composition having oxygen PPM no greater than about 1 PPM while operating the gas generator at ranges which can vary anywhere from 500 to 10,000 CFH at turndown ratios at anywhere from about 3-1 to about 2-1.

It is still yet another feature of the invention to utilize the oxygen enriched permeate gas stream produced by the air separation module to increase the oxygen content of the first prime outlet stream fed to the gas generator to be greater than the oxygen content present in air, namely, 21%. More specifically, it is a feature of the invention to produce a gas feed stream having an oxygen content as high as 40% to be supplied to the endothermic gas generator to produce a product gas high in combustibles such as desired in certain carburizing, brazing and sintering applications.

It is yet another specific feature of the invention to operate the air separation membrane to produce low quantities of oxygen in the nitrogen-oxygen feed stream which are reacted with natural gas in the endothermic gas generator at ratios of 2 parts oxygen to 1 part natural gas to produce a product gas having less than 8% CO and $C0_2$, less than 1 part PPM oxygen with the balance being nitrogen. The $C0$—$CO_2$ is then stripped from the product gas by a molecular sieve to produce a pure nitrogen purged gas with lesser quantities of oxygen than that capable of being produced by the air membrane system.

In accordance with the apparatus aspects of the present invention, the variable gas generator of the present invention includes an air separator producing a nitrogen-oxygen feed stream, an endothermic gas generator heating the nitrogen-oxygen gas stream and a hydrocarbon fuel at elevated temperatures, and a microprocessor which controls the air separator and the gas generator to produce product gas within the ranges specified above. More specifically, the microprocessor utilizes the CO divided by the $CO_2$ ratio of anywhere from higher than 20% to less than 3%. For exothermic generators the maximum $CO/CO_2$ ratio is 2.5 to as low as 0.007. Therefore, since endothermic generators have a lean limit of 31.7 and exothermic generators have a maximum rich limit of 2.4, a substantial gap exists between the two. This invention provides gases that fill this gap and also move across the full output of both generators and beyond. The variable generator of the present invention can deliver a variable range of $CO/CO_2$ ratios from 400 to 0.0001. This control is possible because at the lower CO ratios, oxygen, less than the oxygen percentage available in natural air, is provided from the air separator mechanism. In addition, higher oxygen percentages, greater than the oxygen percentages available in natural air, will provide CO percentages greater than 20%.

In accordance with another feature of the invention, a method or process is provided for generating an industrial gas which includes the steps of providing a conventional air separator membrane and a conventional endothermic gas generator and controlling the temperature and pressure of air admitted to the air separated membrane to produce a nitrogen-oxygen feed gas composition which, in turn, is to be admitted to the endothermic gas generator. The nitrogen-oxygen feed gas has a set oxygen content varying anywhere from 1% to about 40% partial pressure of the nitrogen-oxygen feed gas composition. The nitrogen-oxygen feed gas is mixed with a predetermined amount of hydrocarbon fuel at a ratio of about 2 parts oxygen to 1 part natural gas and admitted to the endothermic generator. Finally, the temperature and flow rate (pressure) of the gases through the air separator and through the endothermic gas generator are the only variables regulated to produce any one type of gas composition from a wide variety of gas compositions as specified above.

It is thus another object of the invention to provide a single gas generator which is capable of producing a wide variety of gas compositions heretofore not possible by any one gas generator.

It is another object of the invention to provide a single gas generator and/or method of operation which produces either an exothermic gas or an endothermic gas.

It is yet another object of the invention to provide a gas generator or a method of operation in which a substantially pure nitrogen purge gas is produced with minimal oxygen content and, in theory, are capable of producing no more than about 1 PPM.

Still yet another feature of the invention is to provide a single gas generator which produces combustible gas composition as high as 80%.

Still yet another feature of the invention is to provide a gas generator which can be operated to produce relatively low percentages of CO and $CO_2$ which can be more easily stripped or scrubbed away from the product gas.

Still another object of the invention is to produce a gas generator which can produce substantially pure gas compositions at costs which are favorable with those charged by bulk gas suppliers.

Yet another object of the invention is to provide a gas generator capable of producing a wide composition of product gas on demand with little start-up and shut down time and with ability to remain idled but ready.

A still further object of the invention is to provide one gas generator which not only can function to produce gas compositions previously made only by exothermic gas generators or only by endothermic gas compositions, but also gas compositions within the ranges of gases not capable of being produced by exothermic or endothermic gas generators.

Still another object of the invention is to provide a low cost gas generator system which in one generator is capable of producing any gas previously produced by any one of a number of gas generators and/or systems.

Still another object of the invention is to provide a gas generator which can be constantly and easily regulated to produce a constant gas composition with little variation in the output gas makeup.

A still further object of the invention is to provide a variable gas generator system which is less expensive to purchase and/or operate than conventional gas generator systems.

These and other objects and advantages of the present invention will become apparent in the following description taken together with the drawings which will be described in the next section.

BRIEF DESCRIPTION OF THE DRAWINGS

The invention may take form in certain parts and arrangement of parts a preferred embodiment of which is illustrated in the drawings wherein:

FIG. 4 is a schematic showing the gas generator and process of the present invention.

DETAILED DESCRIPTION OF THE INVENTION

Figure 1:
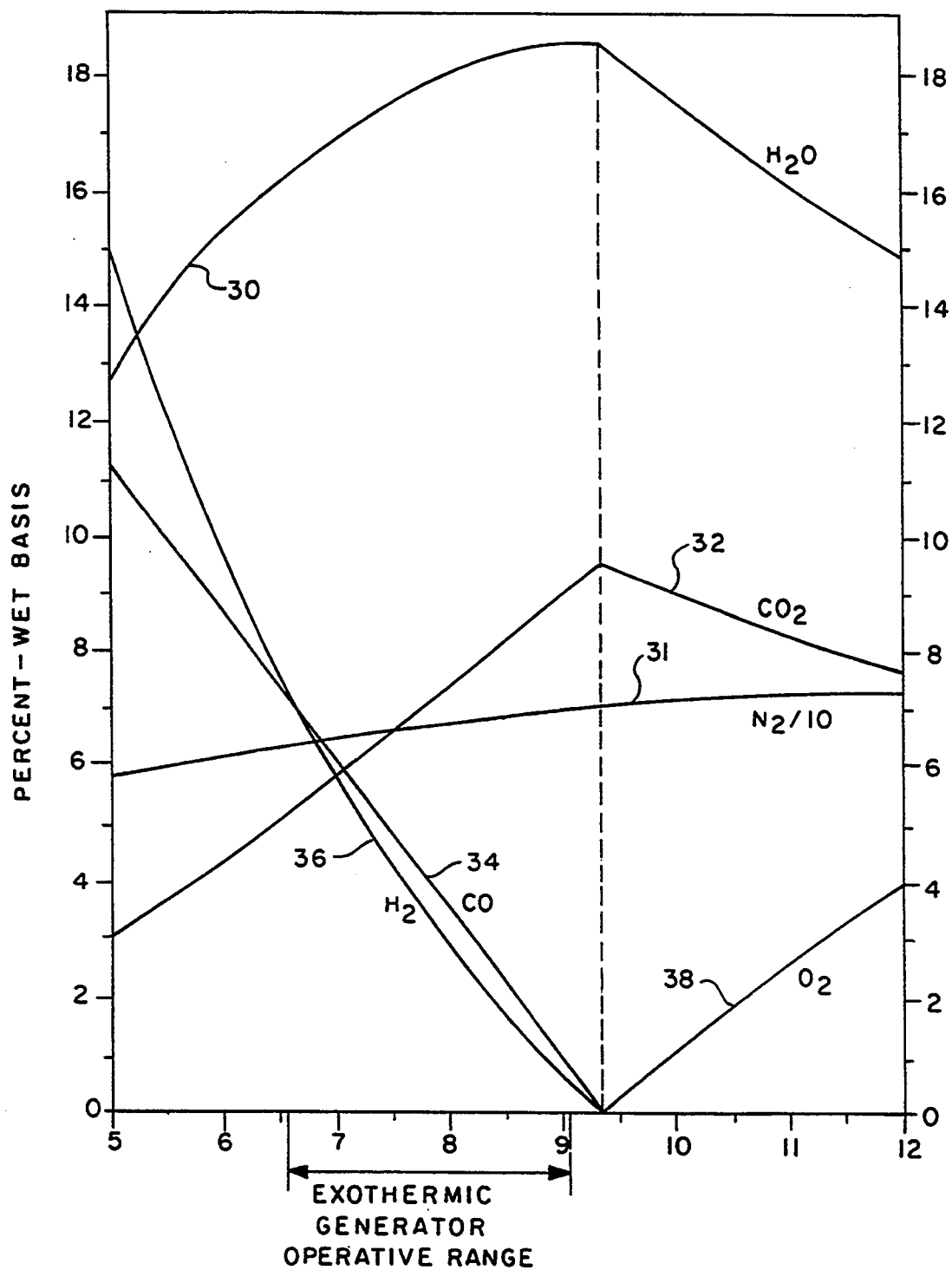
FIG. 1 is a graph showing percentages of gas composition of "product" gas when air is mixed with natural gas at various ratios.

Referring now to the drawings wherein the showing are for the purpose of illustrating the preferred embodiment of the invention only and not for the purpose of limiting same, there is shown basically in FIG. 4 a conventional nitrogen membrane module 10 connected to several conventional endothermic gas generators 20. Both membrane module 10 and endothermic gas generator 20 are conventional, commercially available equipment items.

FIG. 1 is a graph showing gas composition makeup when air and natural gas are combusted at various ratios of air to natural gas. Note that the elements of the gas composition include water vapor, $H_2O$, shown as line 30; nitrogen, $N_2$, shown as line 31; carbon dioxide, $CO_2$, shown as line 32; carbon monoxide, CO, shown as line 34; hydrogen, $H_2$, shown as line 36; and oxygen, $O_2$, shown as line 38. The combustibles are hydrogen, $H_2$, and carbon monoxide, CO. Note that pursuant to the graph of FIG. 1 when air is combusted with natural gas with air at a ratio at about 9.4 parts to one part of natural gas ($CH_4$) the combustion is stoichiometric with no hydrogen or carbon monoxide or oxygen being produced. The graph illustrated in FIG. 1 is based on air having an oxygen content of 20.99% and assumes an equilibrium temperature of 2500° F. At air to natural gas ratios of about 6.529 the reaction is considered exothermic in that heat is released. Accordingly, gas generators operating within the ratio of air at 6.5 to 9 parts per part of natural gas liberate heat and are viewed as exothermic. Note the relatively high percentage of deleterious water vapor present in the gas composition of an exothermic gas generator. Typically, exothermic gas generators are operated with ratios of air to natural gas of anywhere between about 6-1 to 9-1 and produce the following gas compositions by molecular weight:

| Gas Element | Percentage | |
|---|---|---|
| $N_2$ | 87–73% | |
| $H_2$ | .5–10% | |
| CO | .5–11% | |
| $CO_2$ | 11–5% | |
| $H_2O$ | 13–19% | (without a chiller) |
| $CH_4$ | 0.0–1% | |

Note that the sum of combustibles, i.e., $H_2$ and CO, varies anywhere from 1% up to a total of 22% for the gas described.

While in accordance with the very broad aspects of the invention, any gas generator can be employed, it is specifically contemplated and provided in the preferred embodiment that an endothermic gas generator is used. Specifically, the gas compositions discussed herein have been achieved utilizing Surface Combustion's RX Endothermic Gas Atmosphere Generator. Surface's RX model no. RX5-10-1V modular style generator has produced good results.

As a point of reference, air supplied at a ratio of 2.5–1 part of natural gas ($CH_4$) to an endothermic gas generator produces a class 300 gas having a composition of $N_2$ 40%, $H_2$ 39%, CO 20%, $CO_2$ 0.5%, $H_2O$ 0.1%, $CH_4$ 0.4%. Note that the sum of combustibles produced in this gas is approximately 60%. Reference can be had to the Background Patents for a more thorough explanation of the catalyst bed construction used in the RX generator and the various reactions which are produced as the gas and air are heated and travel through the catalyst.

Figure 2:
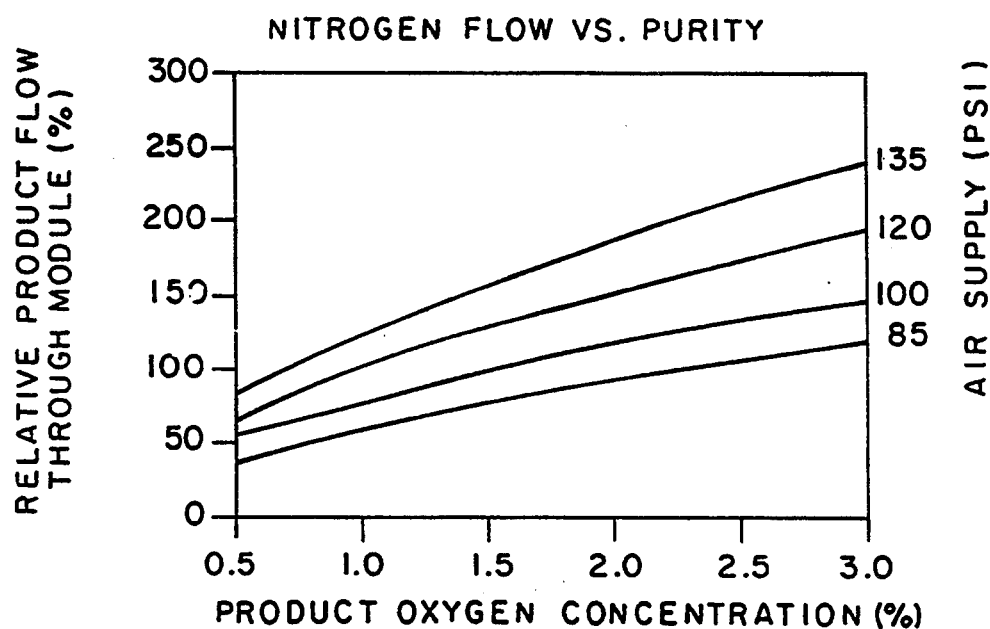
FIG. 2 is a graph showing output flow through a nitrogen membrane separator for air at various supply pressures with purity expressed as oxygen concentration in the "product" gas plotted on the x-axis.
Figure 3:
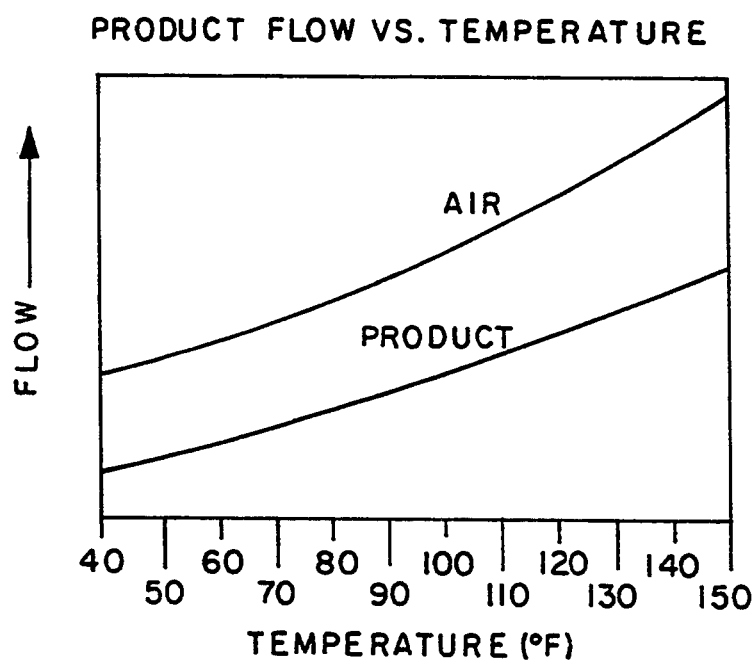
FIG. 3 is a graph of gas flow through a nitrogen membrane separator for various ambient air temperatures.

As shown in FIG. 4, the other basic component of the variable generator 1 of the present invention is the nitrogen membrane module 10 which produces a high amount of nitrogen with a balance of the gas produced being oxygen. Membrane module 10, in simplistic terms, filters the $CO_2$, $H_2O$, $O_2$ and other gases from atmosphere air leaving nitrogen. There are a number of manufacturers of nitrogen membrane modules. One type of nitrogen membrane module which could function for membrane module 10 is supplied by Generon Systems, which is a joint venture company of the Dow Chemical Company and the BOC Group. Nitrogen membrane modules manufactured by others such as Proxair, Permea or Balston are also acceptable. FIGS. 2 and 3 are graphs taken from Generon brochures which show in FIG. 2 that the nitrogen flow rate is directly related to the air supply pressure and further, in FIG. 3, that the product gas flow, i.e., nitrogen, increases as the temperature of the feed air increases. Thus, depending on the inlet pressure of the air to the membrane and the temperature of the incoming air, the amount of oxygen in the exhaust system can be varied. It is possible to generate a dry gaseous nitrogen up to 99.9% pure with 0.1% $O_2$. FIG. 4 illustrates a control arrangement for regulating nitrogen membrane module 10 and endothermic generator 20 to produce gas compositions within the ranges claimed for various heat treat processes. It is to be understood that all valves and regulations described are under the control of a central microprocessor 50 which samples the produced gas through a dew point sensor or $CO/CO_2$ sensor 80, the temperature of the gases inputted into endothermic generators 20 when heated therein and the flow rates of the various gas streams to apply known algorithms to control the valves, regulators and burners to produce the desired gas composition.

It is to be understood that graphs such as that disclosed in FIG. 1 in which, for various temperatures, gas reactions (factoring in the kinetics of the reaction, heat for certain reactions to occur) which produce specified gas compositions are generated by simulated computer programs. Certain characteristics of the product gas such as the CO times $CO/CO_2$ ratio, and the dew point (water vapor), have been found to establish a correlation between the gas composition makeup and the temperature of the gas generator, the catalyst used in the generator and the flow rate (pressure) or residence time of the gas within the catalyst bed. The present invention utilizes conventional computer programs, once the composition of the gas stream into the generator is known, to determine the product gas composition and uses the conventional $CO_2$ or $H_2O$ controller to determine how the system is to be adjusted. The gas reaction, per se, is conventional and the control, per se, is conventional. Similarly, the control of the air separation membrane to produce specific percentages of oxygen and nitrogen is, per se, conventional. Since both controls for membrane module 10 and endothermic gas generators 20 are known, per se, they are not described in detail herein. Coupling the two controls in central microprocessor so that both systems are regulated together to produce a predetermined product gas composition has not been done.

Referring first to the nitrogen-oxygen feed gas produced by nitrogen module 10 on output feed line 40, an air compressor 25 forces compressed air which can be heated by a burner 27 through a filter 28 and motorized valve 29 into nitrogen membrane module 40. The flow rate of incoming atmosphere air is controlled vis-a-vis the graph of FIG. 2 and the temperature of the air is controlled vis-a-vis the graph of FIG. 3 (through central microprocessor 50) to produce a nitrogen-oxygen feed stream in output line 40 which can have a predetermined fixed oxygen content anywhere between 0.1% up to about 21% (i.e., the maximum oxygen contained in atmospheric air). As noted above, certain furnace applications require a generator feed gas having higher than 21% oxygen. To satisfy this requirement, it is possible to use a permeate stream containing pure oxygen filtered by nitrogen membrane module 10 which can be added to the nitrogen-oxygen feed stream in line 40. This is shown in FIG. 4 by simply attaching oxygen permeate line 41 to line 40 and using oxygen valve 42 to control the oxygen addition. Importantly, the oxygen content of the nitrogen-oxygen feed stream is not fixed at 21% as in the prior art. Again, the oxygen content of the nitrogen-oxygen feed stream in line 40 can vary anywhere from 0.1% to 40%. It is also within the scope of the present invention to vary the nitrogen-oxygen gas composition produced by nitrogen membrane module 10 not only by the oxygen permeate stream in line 41, but also by simply adding atmosphere air as by blower 44 introducing pressurized air on air line 43 under control of valve 45. The air will mix with the nitrogen-oxygen produced by nitrogen membrane module 10 and be dissociated in endothermic gas generator 20. Utilizing additional air at controlled flow rates through air line 43 makes it possible to also vary the oxygen content of the nitrogen-oxygen gas produced by nitrogen membrane module 10.

Having thus established a carefully controlled nitrogen-oxygen feed gas with a predetermined oxygen composition in line 40, a hydrocarbon, preferably natural gas, $CH_4$, is added to the nitrogen-oxygen feed stream to produce a generator feed gas in line 65 which is supplied to endothermic generator 20. In the preferred embodiment, natural gas is mixed at the ratio of 2 parts oxygen to one part of natural gas. As shown in FIG. 4, this is achieved by adding natural gas in natural gas line 63, which is under the control of regulators 65, and the nitrogen-oxygen feed stream in line 40 to a conventional mixer 62 to produce the generator feed gas in line 65. It is preferred to inject two natural gas streams 63, 63a, each under control of separate regulators 65, 65a, into gas mixer 62. To assure the desired metering of the streams a $CO_2$ valved control 81 placed in a mixer bypass line 64 receives signals from dew point sensor 80 of the product gas and regulates an addition of the nitrogen-oxygen feed stream to the natural gas and nitrogen-oxygen mixture down stream of mixer 62. To achieve idling, a one-way valve 68 in line 65 shunts the generator feed gas to stack or vent through a vent line 75 under the control of a regulator valve 69, which as shown, is synchronized with motor control valve 66 downstream of mixer 62. A flow meter 79 such as that shown in line 40 is inputted to master microprocessor controller 50 to assure desired system flow conditions. The generator feed gas is then inputted through line 65 to the valved inlet of endothermic gas generators 20. The generator feed gas is heated by burners 67 also under the control of microprocessors 50 and then passed through the catalyst bed within endothermic gas generator 20 after which the dissociated gas, now termed a product gas, is cooled as it exits endothermic gas generator 20 on output line 70 where it is valved as at 71 into furnace line 72 or product gas vent line 73 depending on the furnace requirements. With the generator feed gas into endothermic generator 20 fixed to have an oxygen composition which can be set anywhere from 0.5% to 40% oxygen with the balance nitrogen and with methane or natural gas being added to the nitrogen-oxygen gas steam in the ratio of one part methane for every two parts oxygen, it is possible to produce a final product gas composition within the partial pressure ranges set forth below:

| Gas Element | Percentage |
|---|---|
| $N_2$ | 20–99% |
| $H_2$ | .5–53% |
| CO | .5–27% |
| $CO_2$ | .01–.6% |
| $H_2O$ | .0–.1% |
| $CH_4$ | 0.0–.4% |

It is noted that oxygen, $O_2$, can be varied to achieve a range of combustibles anywhere from 1% up to 80%.

It should also be noted that by operating nitrogen membrane module 10 at its range which produces minimal amounts of oxygen, the oxygen can, for all intents and purposes, be viewed as being removed from the nitrogen by means of endothermic gas generator 20 at least when compared to existing gas generators. Although not yet achieved in practice, in theory substantially pure nitrogen gas can be produced with as little as 1 PPM $O_2$ and that in such instance, $N_2$ comprises approximately 99% of the process gas and the 1% balance is produced approximately ½% of CO and ½% of $H_2$ with perhaps a trace element, if any, of $CH_4$. In any event, the product gas is inert and is extremely satisfactory for furnace purge and annealing processes without having any tendency to oxidize the work. That is the oxygen content of the gas is at least as good as the oxygen content in commercial grade, liquid nitrogen stock of abut 20 PPM (which, by the way, can also be achieved in conventional endothermic gas generators).

To achieve the wide variation in product gas composition, the temperature of the generator feed gas within endothermic generator 20 can be varied by burners 67 to be anywhere from about 1400° F. to as high as 2200° F. Normal heat range of the feed gas within an RX endothermic generator is typically about 1900°–1950° F. Temperature of endothermic generator 20 is regulated by conventional thermocouples within endothermic generator 20 (not shown) and by the output of $CO_2$ or dew point sensor 80 interpreted by microprocessor or controller 50 to control burner 67.

More specifically, the following variables can be controlled to produce the product gas within the ranges specified:
  i) inlet air temperature, vis-a-vis burner 27 for nitrogen membrane module 10;
  ii) inlet air pressure to nitrogen membrane module 10 through compressor 25;
  iii) flow rate of air through membrane module 10 vis-a-vis valve 29;
  iv) utilizing the $O_2$ permeate stream on line 41 to vary the oxygen concentration of membrane module in feed gas on line 40;
  v) varying natural gas additions to the feed stream vis-a-vis natural gas supply 65;
  vi) varying catalyst bed temperature and inlet gas stream temperature in endothermic gas generator 20 vis-a-vis burner 67;
  vii) using a combination nitrogen-oxygen primary feed stream resulting from nitrogen membrane module 10 and the additional permeate $O_2$ stream on line 41 as discussed and/or the additional atmosphere air on line 43 as also discussed.

Further, it is also possible to remove CO, $CO_2$ and/or $H_2O$ by molecular sieves or desiccants diagrammatically shown by reference numeral 90 to further refine the product gas.

With respect to specific product gas compositions, it is known that for certain heat treat processes, such as annealing, CO levels are too high and $CO_2$ levels are too low from the conventional endothermic gas generator. The product gas produced from conventional endothermic generator is too reducing or carburizing in nature. In normal practice, this gas must be diluted with nitrogen which is expensive or some other type of exothermic inert gas must be supplied. In either case, a source of oxidizing gas is required to reduce the $CO_2$ CO ratio of the endothermic gas. For this application, the nitrogen-oxygen feed gas produced in nitrogen membrane module 10 on feed line 40 would be controlled to deliver 5% oxygen with the balance being $N_2$, i.e., 95%. This nitrogen-oxygen feed gas would then be mixed with an appropriate amount of natural gas at 65 through mixer 62 and passed over the catalyst bed in endothermic generator 20 which would be maintained at a temperature in excess of 1850° F. This temperature is used to ensure for this process that less than 0.1% methane is produced in the final product. The final product gas composition would be 90% $N_2$ with 4% CO, 8% $H_2$ and 0.16% $CO_2$. The CO times $CO/CO_2$ ratio is 1. By varying the amount of natural gas reacted, the $CO_2$ level can be greatly altered. The CO times $CO/CO_2$ ratio can therefore be changed over a wide range to suit the process. Similarly, $H_2/H_2O$ ratios are also changed respectively. CO and $H_2$ levels, however, will remain relatively constant and therefore combustible levels will remain constant.

For certain brazing applications, but not limited thereto, higher CO and $H_2$ amounts are desired. To simply accomplish this requirement, nitrogen membrane module 10 would be operated at a different inlet pressure or inlet temperature to produce higher amounts of $O_2$ and, likewise, lower amounts of $N_2$. Assuming the membrane system delivering 10% $O_2$ and 90% $N_2$, the natural gas addition at 65 would thus be operated to deliver approximately double the natural gas addition described in the preceding example. The product gas leaving the catalyst bed in endothermic gas generator 20 will then be approximately 75% $N_2$, 16% $H_2$, 8% CO and 0.5% $CO_2$. The combustible level of the gas will be 24% with a CO times $CO/CO_2$ ratio of 1.28. Higher ratios can be obtained by increasing the natural gas additions. Free methane levels can be increased, if desired, by simply lowering the catalyst bed temperature. In this way, a highly reducing gas suitable for sintering atmospheres can be developed.

Furthermore, as noted above, because exothermic generators have a limit on the amount of combustibles they deliver, endothermic and exothermic gases must be blended, or alternatively, an endothermic gas must be diluted with nitrogen. The variable generator of the present invention, however, combines both conventional processes into one that produces many advantages over conventional approaches since the feed stock or the feed gas is not limited to a 21% oxygen content.

ADVANTAGES OVER CONVENTIONAL APPROACHES a) An exothermic generator is not required. Exothermic generators are historically hard to control, costly to purchase, large in size, and produce a high level of water vapor which is typically undesired in heat treating practice. Exothermic generators also require a water utility which in many areas is becoming more difficult to obtain. Environmental concerns also exist. The generator of the present invention can be designed to require no water utility.

b) The highest CO times $CO/CO_2$ ratio that an endothermic generator can operate reliably is 40. The lowest ratio that can be obtained using conventional practices is 6. Operating the endothermic generator above ratios of 40 will generate high amounts of free carbon which become a maintenance burden. Operating the generator below a ratio of 6.0 will cause combustion of the catalyst and will quickly destroy it. The generator of the present invention can operate at ratios above 40 using the oxygen enriched stream. Likewise the generator can be safely operated at ratios less than 1.0 without damage of the catalyst. In addition, operation at ratios below 20 and even below 1.0 will allow the generator components to enjoy a substantially longer life than possible before.

c) Limits as described above also occur for the exothermic gas generator. Ratios below 1.0 are possible. However, ratios above 11 cause premature generator failure and increased generator maintenance. These limitations do not occur with the generator of the present invention.

d) Nitrogen and endothermic blends allow a wide range of $CO/CO_2$ ratios. However, the cost of nitrogen has been increasing rapidly. The variable generator of the present invention uses nitrogen readily available from air. Alternate nitrogen systems are available at lower operating costs than bulk liquid nitrogen systems. However, they produce free amounts of oxygen that enter the heat treating furnace. The free oxygen, once in the furnace produces undesirable metal-lurgical results many times.

e) Pressure swing absorption nitrogen systems are available that supply nitrogen at a lower cost than bulk liquid. However, such systems produce a cyclical changing oxygen level that is difficult to counteract. Likewise this free oxygen can produce undesirable metallurgical results. The generator of the present invention reacts free amounts of oxygen away before they reach the heat treating furnace. This occurs since the oxygen is mixed with natural gas or other hydrocarbon and is passed across the catalyst bed at a high temperature. Trace oxygen levels are below 1 part per million in the product gas. These low levels are only obtainable with bulk cryogenic liquid nitrogen and not possible with PSA or membrane nitrogen systems directly.

f) In addition, to high bulk nitrogen costs, additional shortcomings exist. These include purchase or leasing of a large bulk nitrogen supply tank, and purchase or leasing of an evaporator to convert the liquid nitrogen to a gas. Bulk nitrogen also is lost to the atmosphere if not consumed at a high enough rate. This approach causes additional cost should the process not run continuously. The generator of the present invention can produce atmosphere on demand with little start-up and shut down time and can also be idled producing no gas, but ready to within a short time.

g) The variable generator of the present invention can also provide purge nitrogen lower in oxygen levels than that obtainable from the membrane system itself. This is possible by reacting the oxygen balance with natural gas and forming $CO_2$ and CO. CO and $CO_2$ can then be stripped, if desired, with an optional molecular sieve. The load on the sieve will be substantially lower than in applications using exothermic gas followed by a molecular sieve. In the latter instance, $CO_2$ levels of 8 to 10% must be removed, whereas in the variable generator of the present invention, extremely small amounts have to be removed, thereby extending recharge time on the sieve materials.

Gas compositions and percentages used throughout this specification means the composition expressed as partial pressure of the gas. Thus, a class 300 gas has 40% of its molecules comprised of $N_2$, 40% of its molecules comprised of $H_2$ and 20% of its molecules comprised of CO. Also, turndown ratio as used in this specification means that the flow rate of the product gas through the generator can be reduced from its stated capacity without affecting the product gas composition. Thus, a generator having a stated output of 1000 SCF/HR with a turndown ration of 2 to 1 can have it's output reduced to 500 SCF/HR. The variable generator of the present invention can always operate at turndown ratios of at least 2 to 1 and in some cases, as high as 3 to 1, which compares favorably to existing turndown ratios of conventional generators.

The invention has been described with reference to a preferred embodiment. Obviously, modifications and alterations will occur to those skilled in the art upon reading and understanding the detailed description set forth above. It is intended to include all such modifications and alterations insofar as they come within the scope of the present invention.

Having thus defined the invention, it is claimed:

1. A gas generator for producing industrial gas mixtures suitable for use in a number of industrial heat treat processes using heat, said generator comprising:
   i) air membrane module means for producing from atmospheric air a variable mixture of nitrogen and oxygen gases as a nitrogen-oxygen output stream;
   ii) a source of hydrocarbon fuel;
   iii) means for mixing said fuel and said output stream; and
   iv) gas generator means for reacting said hydrocarbon fuel mixed with said output stream to form a gas generator feed stream in the presence of heat to produce said industrial gas mixture.

2. The gas generator of claim 1 wherein said industrial gas mixture includes the following gases within any percentage of the ranges specified:

| Gas Element | Percentage |
| --- | --- |
| $N_2$ | 20–99% |
| $H_2$ | .5–53% |
| CO | .5–27% |
| $CO_2$ | .01–.6% |
| $H_2O$ | .0–.1% |

-continued

| Gas Element | Percentage |
| --- | --- |
| CH₄ | .0–.4% |

3. The gas generator of claim 1 wherein said air membrane module means includes means for pressurizing air, means for heating air, and a membrane air separation module for receiving said pressurized, heated air and producing therefrom a first feed stream of nitrogen and oxygen gases in a gas mixture where oxygen can comprise, as a set value, anywhere from about 1 to about 21% of said first nitrogen-oxygen feed stream.

4. The gas generator of claim 1 wherein said generator means includes a conventional, endothermic Rx gas generator.

5. The gas generator of claim 1 wherein said hydrocarbon fuel is natural gas.

6. The gas generator of claim 4 further including a mixer wherein said oxygen in said nitrogen-oxygen feed stream is mixed with natural gas at a ratio of 2 to 1 to form said generator feed gas inputted into said endothermic gas generator.

7. The gas generator of claim 3 wherein said generator has a turndown ratio for any given gas composition of at least 2:1.

8. The gas generator of claim 3 wherein said air separation module further includes a second, oxygen enriched permeate gas stream, and mixing means for mixing said first and second streams to produce a gas mixture containing oxygen as high as 35-40% by volume of the gas generator feed stream introduced into said generator means.

9. The gas generator of claim 3 wherein said generator means includes a conventional, endothermic Rx gas generator.

10. The gas generator of claim 5 wherein said industrial gas mixture includes the following gases within any percentage of the range specified:

| Gas Element | Percentage |
| --- | --- |
| N₂ | 20–99% |
| H₂ | .5–53% |
| CO | .5–27% |
| CO₂ | .01–.6% |
| H₂O | .0–.1% |
| CH₄ | .0–.4% |

11. The gas generator of claim 5 further including molecular sieve means to remove one or more of the following gas components from said industrial gas mixture.

12. A gas generator comprising:
an air separator for producing from air a nitrogen-oxygen feed stream gas comprising nitrogen and oxygen;
an endothermic gas generator for receiving a hydrocarbon fuel and said nitrogen-oxygen feed stream gas and producing, at elevated temperatures, an industrial product gas; and
microprocessor control means for controlling said air separator and said gas generator to produce said product gas having the following components within the ranges specified for said component:

| Gas Element | Percentage |
| --- | --- |
| N₂ | 20–99% |
| H₂ | .5–53% |
| CO | .5–27% |
| CO₂ | .01–.6% |
| H₂O | .0–.1% |
| CH₄ | .0–.4% |

13. The gas generator of claim 12 wherein said nitrogen-oxygen gas stream comprises by partial pressure oxygen ranging anywhere from 1 to about 40 per cent.

14. The gas generator of claim 13 further including said endothermic gas generator having a catalyst and means for heating said fuel and nitrogen-oxygen feed stream admitted thereto to temperatures ranging from about 1200° F. to about 2500° F.

15. The gas generator of claim 14 wherein said microprocessor control means senses the CO times CO/CO₂ ratio present in said industrial product gas and controls the composition of said industrial gas to a CO times CO/CO₂ ratio of anywhere from about 1 to values of at least about 40.

16. The gas generator of claim 12 wherein said industrial gas has a composition of about 90% N₂, 4% CO, 8% H₂ and 0.16% CO₂.

17. The gas generator of claim 12 wherein said industrial gas has a composition of approximately 75% N₂, 16% H₂, 8% CO and 0.5% CO₂.

18. A process for generating an industrial product by means of a conventional air separator membrane and a conventional endothermic gas generator comprising the steps of:
i) controlling the temperature and pressure of air admitted to said air separator membrane to produce a nitrogen-oxygen feed gas stream to be admitted to said endothermic gas generator composed of nitrogen and oxygen, with oxygen comprising anywhere from 1% to about 40% of said nitrogen-oxygen feed gas composition by weight;
ii) mixing a predetermined amount of a hydrocarbon fuel with said nitrogen-oxygen feed gas stream and to form a generator feed stream inputted to said endothermic gas generator; and
iii) controlling the temperature and flow rate of said gases admitted to said generator to produce an industrial gas having a desired gas composition.

19. The process of claim 18 wherein said industrial gas has a composition falling within the ranges of the following elements:

| Gas Element | Percentage |
| --- | --- |
| N₂ | 20–99% |
| H₂ | .5–53% |
| CO | .5–27% |
| CO₂ | .01–.6% |
| H₂O | .0–.1% |
| CH₄ | .0–.4% |

20. The process of claim 19 wherein said industrial gas is suitable for annealing steel, said nitrogen-oxygen feed gas stream comprises about 95% nitrogen and 5% oxygen, said hydrocarbon fuel is methane, said methane is added to said oxygen in about a 2 to 1 ratio and said temperature of said gas within said endothermic generator is maintained at a temperature of about 1850° F. to produce a gas having a composition of about 90% $N_2$, 4% CO, 8% $H_2$ and 0.16% $CO_2$.

21. The process of claim 19 wherein said industrial gas is used as a furnace atmosphere for brazing metal components to one another at elevated temperature, said nitrogen-oxygen feed gas comprises about 10% $O_2$ and 90% $H_2$; said hydrocarbon fuel being methane supplied at a ratio of about 2 to 1 of said oxygen within said feed gas; said industrial gas suitable for brazing comprising about 75% $N_2$, 16% $H_2$; 8% CO; and 0.5% $CO_2$.

22. The process of claim 18 further including the step of stripping CO and $CO_2$ by means of molecular sieve from said industrial product gas produced by said endothermic generator.

23. The process of claim 18 wherein the temperature of the catalyst bed within said endothermic generator is maintained within a range of about 1400° F. to about 2500° F. and normally at about 1900°–1950° F.

24. The process of claim 18 wherein said stripping of $CO_2$ wherein said stripping of $CO_2$ and CO occurs downstream of said endothermic generator.

25. The process of claim 18 further including the step of adding oxygen to said nitrogen-oxygen feed gas stream prior to mixing said hydrocarbon fuel with said nitrogen-oxygen stream to produce said desired gas composition within a $CO/CO_2$ range.

26. The process of claim 25 wherein said additional oxygen is supplied from the oxygen permeate stream of said air separator.

27. The process of claim 25 wherein said additional oxygen is supplied from atmospheric air mixed with said feed gas stream.

28. The process of claim 27 wherein said additional oxygen is additionally supplied from the oxygen permeate stream of said air separator.

29. The gas generator of claim 3 further including blower means for adding atmospheric air to said nitrogen-oxygen output stream for increasing the oxygen content of said output stream.

30. The gas generator of claim 12 further including means to increase the oxygen content of said nitrogen-oxygen feed stream.

31. The gas generator of claim 30 wherein said means includes a blower for injecting atmospheric air into said nitrogen-oxygen feed stream.

32. The gas generator of claim 30 wherein said means includes a valve for injecting a portion of the oxygen enriched permeate stream produced by said air separator into said nitrogen-oxygen feed stream.

* * * * *